United States Patent
Broome et al.

(10) Patent No.: US 12,499,432 B2
(45) Date of Patent: Dec. 16, 2025

(54) TECHNIQUES TO PERFORM OPERATIONS WITH A CONTACTLESS CARD WHEN IN THE PRESENCE OF A TRUSTED DEVICE

(71) Applicant: Capital One Services, LLC, McLean, VA (US)

(72) Inventors: William Broome, Salt Lake City, UT (US); Joshua McGarity, Beacon, NY (US); Timothy Tran, Springfield, VA (US)

(73) Assignee: Capital One Services, LLC, McLean, VA (US)

( * ) Notice: Subject to any disclaimer, the term of this patent is extended or adjusted under 35 U.S.C. 154(b) by 126 days.

(21) Appl. No.: 18/131,489

(22) Filed: Apr. 6, 2023

(65) Prior Publication Data
US 2024/0338675 A1    Oct. 10, 2024

(51) Int. Cl.
*G06Q 20/34*    (2012.01)
*G06Q 20/32*    (2012.01)

(52) U.S. Cl.
CPC ....... *G06Q 20/352* (2013.01); *G06Q 20/3278* (2013.01)

(58) Field of Classification Search
CPC .............................................. G06Q 20/00–425
See application file for complete search history.

(56) References Cited

U.S. PATENT DOCUMENTS

| | | |
|---|---|---|
| 4,683,553 A | 7/1987 | Mollier |
| 4,827,113 A | 5/1989 | Rikuna |
| 4,910,773 A | 3/1990 | Hazard et al. |
| 5,036,461 A | 7/1991 | Elliott et al. |
| 5,363,448 A | 11/1994 | Koopman, Jr. et al. |
| 5,377,270 A | 12/1994 | Koopman, Jr. et al. |
| 5,533,126 A | 7/1996 | Hazard |
| 5,537,314 A | 7/1996 | Kanter |
| 5,592,553 A | 1/1997 | Guski et al. |
| 5,616,901 A | 4/1997 | Crandall |
| 5,666,415 A | 9/1997 | Kaufman |
| 5,763,373 A | 6/1998 | Robinson et al. |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |

(Continued)

FOREIGN PATENT DOCUMENTS

| | | |
|---|---|---|
| CA | 3010336 A1 | 7/2017 |
| CN | 101192295 A | 6/2008 |

(Continued)

OTHER PUBLICATIONS

Batina, L. and Poll, E., "SmartCards and RFID", Course PowerPoint Presentation for IPA Security Course, Digital Security at University of Nijmegen, Netherlands (date unknown) 75 pages.

(Continued)

*Primary Examiner* — Mohammad A. Nilforoush
(74) *Attorney, Agent, or Firm* — KDW Firm PLLC

(57) ABSTRACT

Embodiments are directed to techniques and systems to perform operations with contactless cards and trusted devices.

20 Claims, 9 Drawing Sheets

(56) References Cited

U.S. PATENT DOCUMENTS

| | | |
|---|---|---|
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Kaminkow |
| 8,005,426 B2 | 8/2011 | Huomo et al. |
| 8,010,405 B1 | 8/2011 | Bortolin et al. |
| RE42,762 E | 9/2011 | Shin et al. |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,365,988 B1 | 2/2013 | Medina, III et al. |
| 8,369,960 B2 | 2/2013 | Tran et al. |
| 8,371,501 B2 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,559,872 B2 | 10/2013 | Butler |
| 8,566,916 B1 | 10/2013 | Bailey et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |

(56) References Cited

U.S. PATENT DOCUMENTS

| | | |
|---|---|---|
| 8,752,189 B2 | 6/2014 | de Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,880,027 B1 | 11/2014 | Darringer |
| 8,888,002 B2 | 11/2014 | Marshall Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,280 B2 | 9/2015 | Bona et al. |
| 9,152,832 B2 | 10/2015 | Royston et al. |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,306,626 B2 | 4/2016 | Hall et al. |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,953,323 B2 | 4/2018 | Candelore et al. |
| 9,961,194 B1 | 5/2018 | Wiechman et al. |
| 9,965,756 B2 | 5/2018 | Davis et al. |
| 9,965,911 B2 | 5/2018 | Wishne |
| 9,978,058 B2 | 5/2018 | Wurmfeld et al. |
| 10,043,164 B2 | 8/2018 | Dogin et al. |
| 10,075,437 B1 | 9/2018 | Costigan et al. |
| 10,129,648 B1 | 11/2018 | Hernandez et al. |
| 10,133,979 B1 | 11/2018 | Eidam et al. |
| 10,217,105 B1 | 2/2019 | Sangi et al. |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0247797 A1 | 11/2005 | Ramachandran |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0086767 A1 | 4/2008 | Kulkarni et al. |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |

(56) References Cited

U.S. PATENT DOCUMENTS

| | | |
|---|---|---|
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Ameil et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadarajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0208658 A1 | 8/2011 | Makhotin |
| 2011/0208965 A1 | 8/2011 | Machani |
| 2011/0211219 A1 | 9/2011 | Bradley et al. |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143754 A1 | 6/2012 | Patel |
| 2012/0150737 A1 | 6/2012 | Rottink et al. |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0310832 A1 | 12/2012 | Hammad et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0006847 A1 | 1/2013 | Hammad et al. |
| 2013/0008956 A1 | 1/2013 | Ashfield |
| 2013/0026229 A1 | 1/2013 | Jarman et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou et al. |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0081785 A1 | 3/2014 | Valadas Preto |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0039494 A1* | 2/2015 | Sinton ............... G06Q 20/327 705/39 |
| 2015/0071486 A1 | 3/2015 | Rhoads et al. |
| 2015/0088757 A1 | 3/2015 | Zhou et al. |
| 2015/0089586 A1 | 3/2015 | Ballesteros |
| 2015/0134452 A1 | 5/2015 | Williams |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0205379 A1 | 7/2015 | Mag et al. |
| 2015/0302409 A1 | 10/2015 | Malek et al. |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2015/0373762 A1 | 12/2015 | Raj et al. |
| 2016/0012465 A1 | 1/2016 | Sharp |

(56) References Cited

U.S. PATENT DOCUMENTS

| | | |
|---|---|---|
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1* | 10/2016 | Zarakas ............... G06K 19/02 |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140368 A1 | 5/2017 | Griffin et al. |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0068316 A1 | 3/2018 | Essebag et al. |
| 2018/0129945 A1 | 5/2018 | Saxena et al. |
| 2018/0160255 A1 | 6/2018 | Park |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0238517 A1 | 8/2019 | D'Agostino et al. |

FOREIGN PATENT DOCUMENTS

| | | |
|---|---|---|
| CN | 103023643 A | 4/2013 |
| CN | 103417202 A | 12/2013 |
| EP | 1085424 A1 | 3/2001 |
| EP | 1223565 A1 | 7/2002 |
| EP | 1265186 A2 | 12/2002 |
| EP | 1783919 A1 | 5/2007 |
| EP | 2139196 A1 | 12/2009 |
| EP | 1469419 A1 | 8/2012 |
| EP | 2852070 A1 | 3/2015 |
| GB | 2457221 A | 8/2009 |
| GB | 2516861 A | 2/2015 |
| GB | 2551907 A | 1/2018 |
| KR | 101508320 B1 | 4/2015 |
| WO | 0049586 A1 | 8/2000 |
| WO | 2006070189 A2 | 7/2006 |
| WO | 2008055170 A2 | 5/2008 |
| WO | 2009025605 A2 | 2/2009 |
| WO | 2010049252 A1 | 5/2010 |
| WO | 2011112158 A1 | 9/2011 |
| WO | 2012001624 A1 | 1/2012 |
| WO | 2013039395 A1 | 3/2013 |
| WO | 2013155562 A1 | 10/2013 |
| WO | 2013192358 A2 | 12/2013 |
| WO | 2014043278 A1 | 3/2014 |
| WO | 2014170741 A2 | 10/2014 |
| WO | 2015179649 A1 | 11/2015 |
| WO | 2015183818 A1 | 12/2015 |
| WO | 2016097718 A1 | 6/2016 |
| WO | 2016160816 A1 | 10/2016 |
| WO | 2016168394 A1 | 10/2016 |
| WO | 2017042375 A1 | 3/2017 |
| WO | 2017042400 A1 | 3/2017 |
| WO | 2017157859 A1 | 9/2017 |
| WO | 2017208063 A1 | 12/2017 |
| WO | 2018063809 A1 | 4/2018 |
| WO | 2018137888 A1 | 8/2018 |

OTHER PUBLICATIONS

Haykin, M. and Warnar, R., "Smart Card Technology: New Methods for Computer Access Control", Computer Science and Technology NIST Special Publication 500-157:1-60 (1988).

Lehpamer, H., "Component of the RFID System", RFID Design Principles, 2nd edition pp. 133-201 (2012).

Author Unknown, "CardrefresherSM from American Express®", [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool", [online] 2018-2019 [retrieved on Mar. 25, 2019]. Retrieved from Internet URL: https://www.authorize.net/our-features/account-updater/, 5 pages.

Author Unknown, "Visa® Account Updater for Merchants", [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay", Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

Author Unknown, "NFC Guide: All You Need to Know About Near Field Communication", Square Guide [online] 2018 [retrieved on Nov. 13, 2018]. Retrieved from Internet URL: https://squareup.com/guides/nfc, 8 pages.

(56) References Cited

OTHER PUBLICATIONS

Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.
Cozma, N., "Copy data from other devices in Android 5.0 Lollipop setup", CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.
Kevin, Android Enthusiast, "How to copy text string from nfc tag", StackExchange [online] 2013 [retrieved on Mar. 25, 2019]. Retrieved from the Internet URL: https://android.stackexchange.com/questions/55689/how-to-copy-text-string-from-nfc-tag, 11 pages.
Author Unknown, "Tap & Go Device Setup", Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.
Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.
Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.
Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.
Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.
Adams, D., and Maier, A-K., "Goldbug Big Seven open source crypto-messengers to be compared—or: Comprehensive Confidentiality Review & Audit of GoldBug Encrypting E-Mail-Client & Secure Instant Messenger", Big Seven Study 2016 [online] [retrieved on Mar. 25, 2019]. Retrieved from Internet URL: https://sf.net/projects/goldbug/files/bigseven-crypto-audit.pdf, 309 pages.
Author Unknown, "Triple DES", Wikipedia [online] 2018 [retrieved on Mar. 25, 2019]. Retrieved from Internet URL: https://simple.wikipedia.org/wiki/Triple_DES, 2 pages.
Song F., and Yun, A.I., "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.
Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.
Berg, G., "Fundamentals of EMV", Smart Card Alliance [online] date unknown [retrieved on Mar. 27, 2019]. Retrieveed from Internet URL: https://www.securetechalliance.org/resources/media/scap13_preconference/02.pdf, 37 pages.
Pierce, K., "Is the amazon echo nfc compatible?", Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.
Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.
Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.
Van den Breekel, J., et al., "EMV in a nutshell", Technical Report, 2016 [retrieved on 2019-Mar. 25, 2019]. Retrieved from Internet URL: https://www.cs.ru.nl/E.Poll/papers/EMVtechreport.pdf, 37 pages.
Author Unknown, "Autofill", Computer Hope [online] 2018 [retrieved on Mar. 25, 2019]. Retrieved from Internet URL: https://www.computerhope.com/jargon/a/autofill.htm, 2 pages.
Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.
Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.
Menghin, M.J., "Power Optimization Techniques for Near Field Communication Systems", 2014 Dissertation at Technical University of Graz [online]. Retrieved from Internet URL: https://diglib.tugraz.at/download.php?id=576a7b910d2d6&location=browse, 135 pages.
Mareli, M., et al., "Experimental evaluation of NFC reliability between an RFID tag and a smartphone", Conference paper (2013) IEEE Africon At Mauritius [online] [retrieved on Mar. 25, 2019]. Retrieved from Internet URL: https://core.ac.uk/download/pdf/54204839.pdf, 5 pages.
Davison, A., et al., "MonoSLAM: Real-Time Single Camera SLAM", IEEE Transactions on Pattern Analysis and Machine Intelligence 29(6): 1052-1067 (2007).
Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.
Author Unknown: "onetappayment™", [online] Jan. 24, 2019, [retrieved on Mar. 25, 2019]. Retrieved from Internet URL: https://www.payubiz.in/onetap, 4 pages.
Vu, et al., "Distinguishing users with capacitive touch communication", Proceedings of the Annual International Conference on Mobile Computing and Networking, 2012, MOBICOM. 10.1145/2348543.2348569.
Pourghomi, P., et al., "A Proposed NFC Payment Application," International Journal of Advanced Computer Science and Applications, 4(8):173-181 (2013).
Author unknown, "EMV Card Personalization Specification", EMVCo., LLC., specification version 1.0, (2003) 81 pages.
Ullmann et al., "On-Card" User Authentication for Contactless Smart Cards based on Gesture Recognition, paper presentation LNI proceedings, (2012) 12 pages.
Faraj, S.T., et al., "Investigation of Java Smart Card Technology for Multi-Task Applications", J of Al-Anbar University for Pure Science, 2(1):23 pages (2008).
Dhamdhere, P., "Key Benefits of a Unified Platform for Loyalty, Referral Marketing, and UGC" Annex Cloud [online] May 19, 2017 [retrieved on Jul. 3, 2019]. Retrieved from Internet URL: https://www.annexcloude.com/blog/benefits-unified-platform/, 13 pages.
The International Search Report and Written Opinion dated Jul. 10, 2024, for corresponding PCT/US24/23015 (nine (9) pages).

* cited by examiner

TECHNIQUES TO PERFORM OPERATIONS WITH A CONTACTLESS CARD WHEN IN THE PRESENCE OF A TRUSTED DEVICE

BACKGROUND

Data security and transaction integrity are of critical importance to businesses and consumers. This need continues to grow as electronic operations with contactless cards constitute an increasingly large share of commercial activity.

Prior attempts to provide additional security for contactless card operations include user actions, such as entering a PIN into a system or their zip code, emailing the user, or sending a text message to the customer to verify the operations. These solutions substantially delay processing operations and put a burden on the user.

BRIEF SUMMARY

Embodiments may be generally directed to a contactless card, having a first interface, a second interface, a memory configured to store instructions, and processing circuitry configured to execute the instructions. The instructions, when executed, cause the processing circuitry to communicate, via the first interface, with a first device to perform an operation, send, via the second interface, a message in an attempt to detect nearby devices, receive, via the second interface, an interface identifier for an interface of a second device, the interface identifier communicated in a response to the message, and send, via the first interface, the interface identifier for the interface to the first device, the first device configured to verify that the interface identifier for the interface is associated with the contactless card to perform the operation.

Embodiments may also be generally directed to a system, including memory configured to store instructions, and processing circuitry coupled with the memory. The processing circuitry is configured to execute the instructions, that when executed, cause the processing circuitry to receive transaction data from a first device to process a transaction with a contactless card, receive an interface identifier from a contactless card via the first device, the contactless card configured to obtain the interface identifier from another device within a short-range communication range, and the interface identifier identifies an interface of the other device, verify the interface identifier is associated with the contactless card, and enable the transaction between the first device and the contactless card based on the transaction data and the interface identifier associated with the contactless card.

A mobile device including a wireless interface, a memory configured to store instructions, and processing circuitry coupled with the wireless interface, and the memory. The processing circuitry configured to process the instructions, that, when executed, cause the processing circuitry to detect, via the wireless interface, a communication from a short-range low energy communication interface of a contactless card, send, via the wireless interface, a response comprising an interface identifier to identify the wireless interface to the contactless card, receive a request from a server associated with the contactless card, the request requesting confirmation to perform a transaction associated with the contactless card, and send a response to the server, the response comprising a confirmation to enable the transaction with the contactless card.

BRIEF DESCRIPTION OF THE SEVERAL VIEWS OF THE DRAWINGS

To easily identify the discussion of any element or act, the most significant digit or digits in a reference number refer to the figure number in which that element is first introduced.

DETAILED DESCRIPTION

Figure 1:
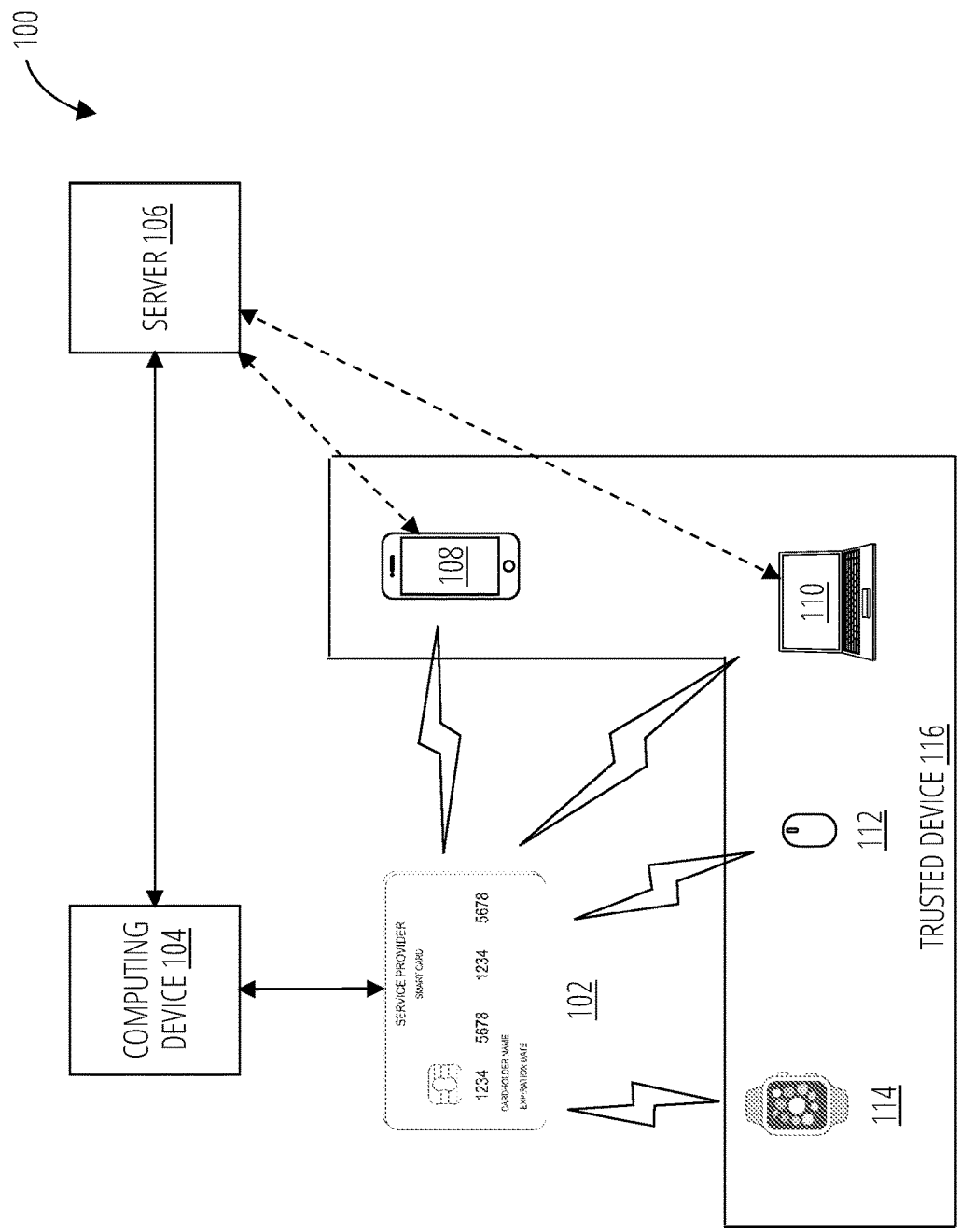
FIG. 1 illustrates an example of a system 100 in accordance with embodiments.

Embodiments are generally directed to techniques and systems to enable a contactless card to perform operations if in the presence of another trusted device. These techniques improve the current state of the art by adding a layer of security when performing operations with the contactless card. For an operation to occur successfully, a user must have the contactless card and be in the presence of another device associated with or registered to the contactless card. At least some embodiments are improvements over traditional techniques by not requiring a user to enter a PIN or provide confirmation via an email or responding to text messages. Thus, transactions may occur quicker and more seamlessly than with previous solutions.

As discussed in more detail in the following description, a contactless card may be configured to perform any number of operations. For example, the contactless card may be used to perform transactions, access spaces, verify the user, launch an application on another device, autofill fields on another device, etc. In one specific example, the contactless card may be used to perform a transaction with a device, such as a point-of-sale terminal to purchase a service or good. The user may present the card to the POS device by inserting the card in a chip reader or bringing the card within the wireless communication range of the POS terminal. The contactless card and the POS terminal may exchange data, including information to perform the transaction. In addition, the contactless may determine to perform a discovery operation to detect any additional devices. The discovery operation may include communicating one or more messages and receiving one or more responses from other devices. The responses may include unique identifiers that may be used to identify a particular and whether they are registered as a trusted device or not.

In embodiments, the contactless card may provide the information collected from the other devices and send it to the POS terminal, which may be configured to send the information to another system along with the card and transaction information. The system may receive the information from the POS terminal and verify the information from the POS terminal, including determining whether the contactless card is near a trusted device or not. If the information is verified, the system may permit the transaction to occur. However, if the information cannot be verified, the system may decline the transaction. These and other details will become more apparent in the following description.

Embodiments may include additional advantages over prior systems by enabling the contactless card to leverage power from one device to power one or more components to detect nearby devices. Specifically, a contactless card may include a power component, including circuitry to generate power when in the magnetic field generated by another device, such as the POS terminal, to communicate with the card. The power component may be configured to utilize and supply the power to other components, such as the wireless interface and processing circuitry that may operate to perform the discovery operation. The power component includes additional hardware to also store energy, e.g., a battery.

FIG. 1 illustrates an example of a system 100 in accordance with embodiments. The system 100 may perform operations between a contactless card 102 and another computing device computing device 104, such as point-of-sale terminals, mobile devices, personal computers, automatic teller machines, etc. In embodiments, an operation may be permitted to be performed or not performed based on the presence of a trusted device 116. In embodiments, the contactless card 102 may be configured to detect one or more wireless devices via an interface. A server may be configured to verify that at least of the devices is a trusted device 116. Examples, of operations that may be performed with the contactless card 102 include transaction operations, access operations, applet/application operations, auto-filling operations, verification operations, etc. Ensuring that a trusted device 116 is near a contactless card 102 to perform an operation provides an extra level of security by requiring that the user has both a contactless card 102 associated with the user and another trusted device 116 that is also associated with the user and/or the contactless card 102.

In embodiments, the contactless card 102 may be any type of contactless card 102, including a credit card, a debit card, a rewards card, a gift card, an access card, a keycard, and so forth. As illustrated and discussed concerning FIG. 3 and FIG. 4, the contactless card 102 may include several components, including a processor 402, memory 404, and interfaces to enable the card to perform the operations discussed herein. The interfaces may include wireless interfaces (NFC interface 420 & Bluetooth interface 422) and wired or physical interfaces (contact interface 428 & stripe 426). The contactless card 102 may also include a power component to harness and/or provide power to the other components of the contactless card 102 to perform the operations. Sometimes, the power component may include a battery to store energy. In some embodiments, the power component may also be configured to energize when in a magnetic field, such as those created by NFC, Bluetooth, and WiFi communications. The power generated by a magnetic field may be provided to the components to perform the operations and/or stored in a battery for processing future operations.

A computing device 104 may be any device capable of performing operations, such as transactions, granting access to a door, verifying the user, launching applications, initiating a contactless card, etc. For example, the computing device 104 may be a POS terminal, a smart lock, a mobile device, a personal computer, a smartwatch, etc. Embodiments are not limited to these examples.

The computing device 104 may include hardware and software components to perform the operations discussed herein. For example, the computing device 104 may include one or more interfaces configured to operate with contactless card 102. The interfaces may include a wireless NFC interface, an Europay, Mastercard, Visa (EMV) chip card reader, a stripe reader, etc. Interfaces may also include wired or wireless networking interfaces to communicate on a computing network, a printer interface, serial interfaces, etc.

The computing device 104 may include additional components, including memory configured to store instructions to perform the operations discussed herein, processing circuitry to process the instructions, and storage to persistently store the instructions. The computing device 104 may also include a display including a touch interface, a keyboard, a mouse, etc.; embodiments are not limited in this manner.

In embodiments, the system 100 includes a server 106 configured to enable the operations, including verifying the contactless card 102 and contactless card 102, and verifying the one or more trusted devices 116. In some instances, the server 106 may be part of a banking system configured to perform transactions and other banking operations. However, in another example, the server 106 may be part of another system, such as a hotel or business system configured to provide access to entryways via a contactless card 102. In some embodiments, the contactless card 102, server 106, etc., may be configured to perform and process multiple functions, e.g., transaction operations, verification operations, access operations, etc. Embodiments are not limited in this manner.

The server 106 may include hardware components, including one or more interfaces, memory, storage, processors, processing circuitry, wired and wireless networking components, etc. In embodiments, the server 106 may be configured to process data from the contactless card 102 and the computing device 104 to enable operations. Although server 106 is illustrated as a single device, in some embodiments, the system 100 may include additional servers and components configured to process at least a portion of instructions to enable the operations.

In embodiments, the server 106 may include a data store to store transaction data and identification data to associate each contactless card 102 with one or more trusted devices 116. In some embodiments, the system 100 may include a data store, storage unit, or storage device, including non-volatile storage persistently store data for the contactless card 102. The data may include at least a portion of data provided to the contactless card 102 to perform a transaction. The data may also include an identifier associated with a trusted device 116 and a contactless card 102. For example, each trusted device 116 may be registered to a contactless card 102, e.g., through a registration process. Identifying data to identify the trusted device 116 may be linked with the contactless card 102 in the data store. The identifying data may be an interface identifier to identify a wireless interface of the trusted device 116. Embodiments are not limited to this example.

In embodiments, a trusted device 116 may be any device configured and associated with the contactless card 102 that can be detected by the contactless card 102 via wireless communications. For example, a trusted device 116 may be a mobile device 108, a computer 110, a mouse 112, a wearable 114, etc. In embodiments, the contactless card 102 may utilize a wireless interface, such as the Bluetooth interface 422, to perform a discovery operation to detect other nearby devices that are within wireless communication range of the contactless card 102.

In embodiments, a trusted device 116 may go through a registration process to become a trusted device 116. For example, a user may register a device with the system 100 as a trusted device through an application, web-based interface, or the like. In an example, the user may utilize a mobile app on a mobile device 108 to register one or more devices as a trusted device 116. The mobile device 108 may detect nearby devices and determine their interface identifiers or addresses. The mobile device 108 may provide the detected identifiers to the server 106 or coupled system to associate with the contactless card 102. In embodiments, the mobile device 108 may provide its identifier or address to register itself as a trusted device 116. Embodiments are not limited in this manner.

Figure 2:
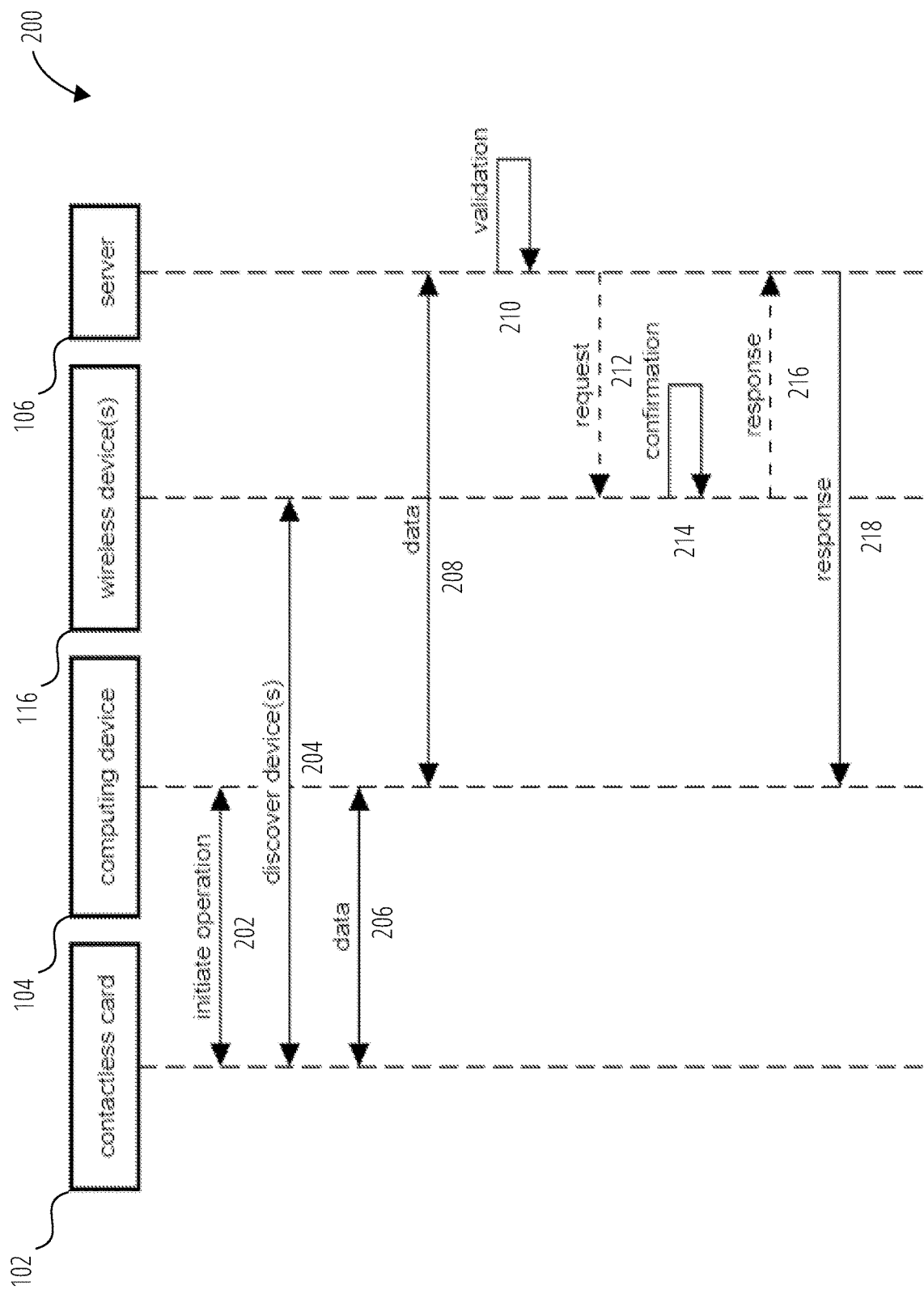
FIG. 2 illustrates an example of a sequence flow 200 in accordance with embodiments.

FIG. 2 illustrates an example sequence flow 200 that may be performed by system 100. In the illustrated example, a user may be utilizing a contactless card 102 to perform an operation, such as performing a transaction, accessing a door, initiating an operation on a mobile device, etc. A server 106 is configured to validate the information stored on the contactless card 102 and if the contactless card 102 can communicate wirelessly with a trusted device 116.

At 202, the contactless card 102 may initiate an operation with a computing device 104. For example, the contactless card 102 may engage the computing device 104 to perform a transaction. In one example, the contactless card 102 can exchange information wirelessly via NFC exchange between the contactless card 102 and computing device 104. The exchange may include the contactless card 102 sending data to the computing device 104. The data may include a cryptogram, as described in FIG. 3 and FIG. 4. In other instances, the contactless card 102 may be inserted into a chip reader of the computing device 104 and may exchange the data with the computing device 104 via wired connections, e.g., via one or more contact pads. In a third example, the computing device 104 may read the data from the contactless card 102 via the contactless card 102 being swiped in a card swipe reader of the computing device 104.

At 204, the contactless card 102 may discover one or more wireless devices, including trusted device 116. For example, the contactless card 102 may initiate an interface, such as a Bluetooth interface in discovery mode, to discover one or more other devices within a wireless communication range of the contactless card 102. In embodiments, the contactless card 102 may initiate the discovery of other devices based on or in response to an indication received from the computing device 104. Specifically, the contactless card 102 may receive an instruction from the computing device 104 to perform the discovery to determine whether trusted devices 116 are within range of the contactless card 102.

In embodiments, the contactless card 102 may include a battery, as previously discussed, and one or more hardware components of the contactless card 102 may utilize the battery's stored power to at least perform the discovery operation. In some instances, the contactless card 102 may be configured to harvest energy from computing device 104 to power the interface to perform the discovery operation. For example, the contactless card 102 and computing device 104 may be coupled wirelessly through short-range communication interfaces, e.g., NFC interfaces and the contactless card 102 may utilize the power produced by the contactless card 102 being in a magnetic field generated by the computing device 104. The power may be supplied to perform a data exchange with the computing device 104 and provided to another interface, e.g., the Bluetooth interface, to perform the discovery operation. In another example, the contactless card 102 may be physically coupled with the card reader of the computing device 104, e.g., an EMV reader. The reader may supply power directly to the card through one or more contacts. Similarly, the power may be used to perform the data exchange between the contactless card 102 and the computing device 104 and for the contactless card 102 to discover other devices.

In embodiments, the discovery operation may be a wireless discovery operation to detect nearby devices, e.g., within the wireless range of the contactless card 102. The range may be based on the wireless communication protocol and interface. For example, a Bluetooth low-energy interface may have a communication/detection range of ~hundred meters or less. A ZigBee or other RFID interfaces may have a similar detection range, while the range for an NFC interface is ~ten centimeters or less.

The contactless card 102 may initiate the discovery operation via an interface, e.g., the Bluetooth interface, and exchange data with one or more other devices. The exchange may include a discovery request sent by the contactless card 102 and a response provided by other devices. In some embodiments, the contactless card 102 may issue one discovery request and receive multiple discovery responses, and each discovery response is received from one of a plurality of devices. For example, the contactless card 102 utilizing a Bluetooth interface 422 may issue three advertisement messages and wait for responses. Any device within range may respond to the advertisements with a response, e.g., (SCAN_REQ packet). The response may include an interface identifier from the other device's interfaces. For example, each device within the Bluetooth communication range may provide its Bluetooth interface's identifier, such as the Bluetooth address or media access control (MAC) address. The Bluetooth MAC address may be a 48-bit value address that uniquely identifies the interface. Other protocols and interfaces may provide similar interface addresses or unique identifiers.

At 206, the contactless card 102 may communicate data with the computing device 104. The data may include one or more interface identifiers provided by the devices within range of the contactless card 102, e.g., Bluetooth MAC Address. The data may be provided to the computing device 104 via the interface with an established communication exchange with the computing device 104, e.g., the NFC interface or chip card reader interface. If contactless card 102 has not already provided information to perform the operation, e.g., card information, the contactless card 102 may also send the card information at step 206. The card information can include a cryptogram, including an account identifier, a counter, a unique identifier, an expiration date, a CVV, etc. In embodiments, the cryptogram may be encrypted utilizing diversified keys, as discussed herein.

At 208, the computing device 104 may provide data to the server 106. In some embodiments, the data may be sent via one or more application programming interfaces (APIs) hosted by the server 106. The data may include the card information, e.g., the cryptogram, and each interface identifier detected by the contactless card 102. In one example, the computing device 104 may send one API communication with the cryptogram and a second API communication with one or more interface identifiers; however, embodiments are not limited in this manner.

At 210, the server 106 may perform one or more operations to validate the data from the computing device 104. Specifically, the server 106 may perform one or more operations to determine the data in the cryptogram, including the counter value and a unique identifier for the contactless card 102 matches a validated counter value and a validated unique identifier stored on the server 106 or storage device associated with the server 106. The server 106 may perform additional validation steps for the card data, including generating a local set of keys to decrypt the cryptogram. Successfully decrypting the cryptogram with the generated key provides an additional level of security by ensuring that the expected keys were used to encrypt the cryptogram.

In embodiments, the server 106 is also configured to validate whether the computing device 104 has provided at least one interface identifier that is associated with the contactless card 102., e.g., validate the card is near a trusted device 116 Specifically, the server 106 compares the received interface identifiers to one or more previously provided interface identifiers for trusted devices 116. The previously provided interface identifiers may be stored in a data store and linked with the contactless card 102. As mentioned, the system 100 enables users to register one or more trusted devices 116 and associates those devices with the user's contactless card 102. The association may be a link between each trusted device's interface identifier and the contactless card 102 in a database or data store. In embodiments, the registration process may be performed by a user via a mobile application on a mobile device, or through a web interface via a mobile device or another computing device. The registration process may include logging into an account associated with the contactless card 102 to verify the user and the user may provide interface identifiers to the system 100.

Once validated, the server 106 may enable the operation to occur. However, in other instances, the server 106 may provide an additional check by sending a communication to a device associated with the user. Note that the device may be the trusted device 116 identified or another device associated with the user. At 212, the server 106 may send a request to a device. The request may require the user of the device to confirm the operation to be performed with the contactless card 102. For example, the request may be a text message, or a mobile app message prompting the user to confirm the operation and provide a response. The prompt may be presented on the display of the device. At 214, the user may provide confirmation via user input, e.g., touchscreen interface or button. At 216, the trusted device 116 may return a response to server 106. The response may include a confirmation to proceed with the operation, or an indication that the user declined the operation or failed to provide a response. The server 106 may receive the response and process it accordingly, e.g., proceed with the operation if it's approved and prevent the operation if it's declined or a response has not been received.

At 218, the server 106 provides a response to the computing device 104. The response may include an indication that the operation is approved, e.g., a transaction is authorized or declined. Other indications may include information for the computing device 104 to finalize and/or perform the operation. Embodiments are not limited in this manner.

Figure 3:
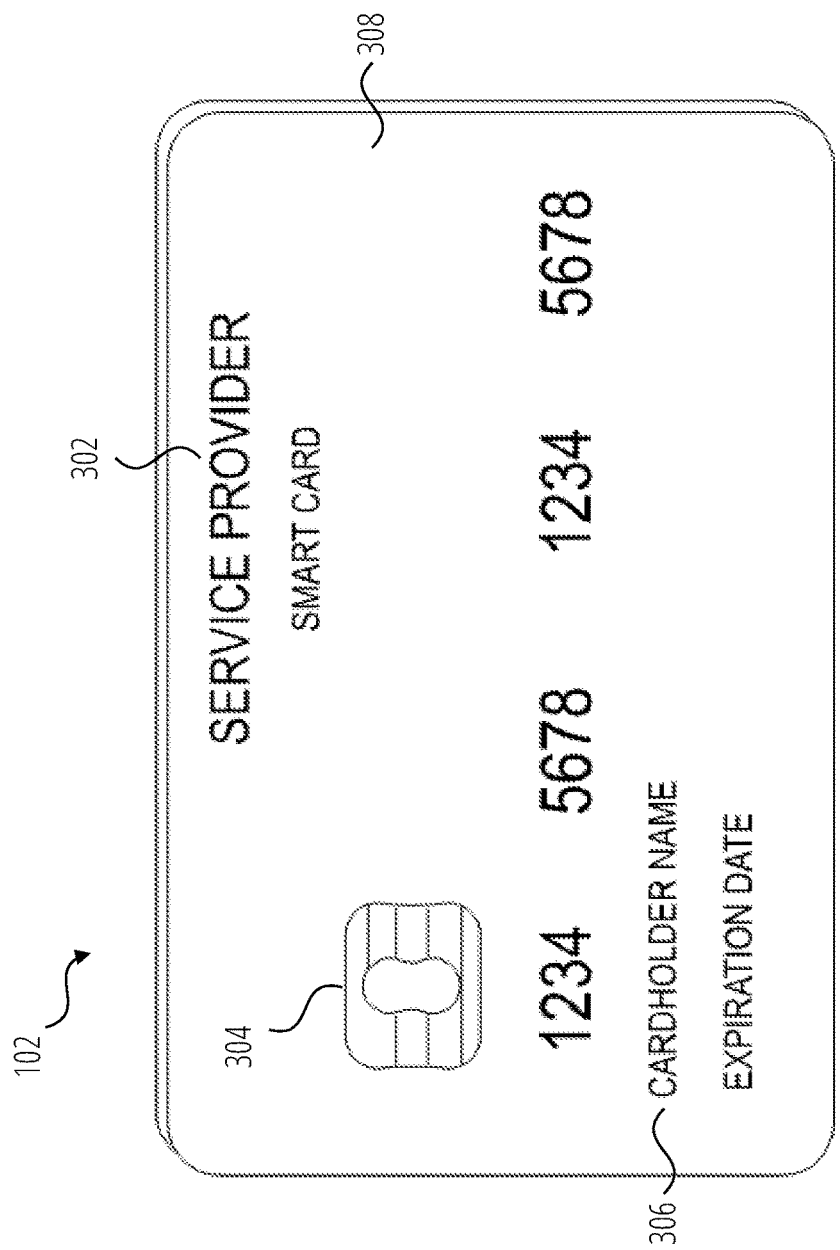
FIG. 3 illustrates an example of a contactless card 102 in accordance with embodiments

FIG. 3 illustrates an example configuration of a contactless card 102, which may include a contactless card, a payment card, such as a credit card, debit card, or gift card, issued by a service provider as displayed as service provider indicia 302 on the front or back of the contactless card 102. In some examples, the contactless card 102 is not related to a payment card and may include, without limitation, an identification card, a key card, or an access card. In some examples, the transaction card may include a multi-interface contactless payment card, a rewards card, and so forth. The contactless card 102 may include a substrate 308, which may include a single layer, or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 102 may have physical characteristics compliant with the ID-1 format of the ISO/IEC 7816 standard, and the transaction card may otherwise be compliant with the ISO/IEC 1443 standard. However, it is understood that the contactless card 102, according to the present disclosure, may have different characteristics, and the present disclosure does not require a transaction card to be implemented in a payment card.

The contactless card 102 may also include identification information 306 displayed on the card's front and/or back and a contact pad 304. The contact pad 304 may include one or more pads and be configured to establish contact with another client device, such as an ATM, a user device, a smartphone, a laptop, a desktop, a point-of-sale terminal, or a tablet computer via transaction cards. The contact pad may be designed per one or more standards, such as ISO/IEC 7816 standard, and enable communication per the EMV protocol. The contactless card 102 may also include processing circuitry, antenna, and other components, as will be further discussed in FIG. 4. These components may be located behind the contact pad 304 or elsewhere on the substrate 308, e.g., within a different layer of the substrate 308, and may electrically and physically couple with the contact pad 304. The contactless card 102 may also include a magnetic strip or tape, which may be located on the back of the card (not shown in FIG. 3). The contactless card 102 may include additional interfaces, such as a Near-Field Communication (NFC) device coupled with an antenna capable of communicating via the NFC protocol, and a Bluetooth interface configured to communicate via the Bluetooth protocol. Embodiments are not limited in this manner.

Figure 4:
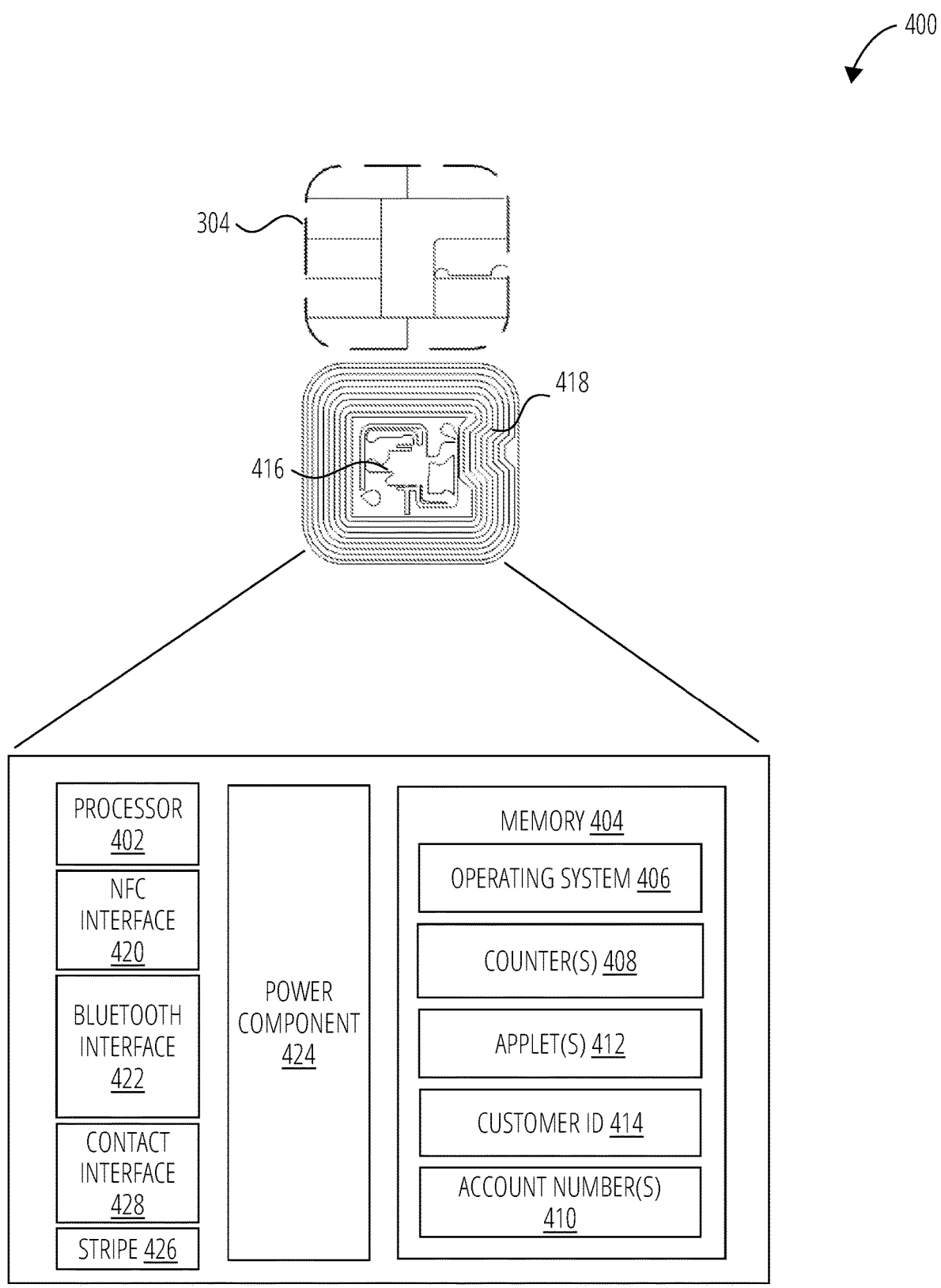
FIG. 4 illustrates a transaction card component 400 in accordance with embodiments.

As illustrated in FIG. 4, the contact pad 304 of contactless card 102 may include processing circuitry 416 for storing, processing, and communicating information, including a processor 402, a memory 404, power component 424, and one or more interfaces, including an NFC interface 420, a Bluetooth interface 422, a contact interface 428, and a stripe 426. It is understood that the processing circuitry 416 may contain additional components, including processors, memories, error and parity/CRC checkers, data encoders, anticollision algorithms, controllers, command decoders, security primitives, and tamper-proofing hardware, as necessary to perform the functions described herein. In some embodiments, at least a portion of the processing circuitry 416 may be in a different portion of the contactless card 102, e.g., not under the contact pad 304.

The memory 404 may be a read-only memory, write-once read-multiple memory, or read/write memory, e.g., RAM, ROM, and EEPROM, and the contactless card 102 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programmed many times after leaving the factory. A read/write memory may also be read many times after leaving the factory. In some instances, the memory 404 may be encrypted memory utilizing an encryption algorithm executed by the processor 402 to encrypted data. In embodiments, the memory 404 may include a volatile portion of memory to store instructions during execution by the processor 402.

The memory 404 may be configured to store one or more pieces of software and an operating system 406, such as the Java Card operating system or any other smart card operating system for applet(s) 412 to operate within. The memory 404 may store the applet(s) 412, and one or more counter(s) 408, a customer identifier 414, and the account number(s) 410, which may be virtual account numbers.

The one or more applet(s) 412 may comprise one or more software applications configured to execute on one or more contactless cards, such as a Java® Card applet. However, it is understood that applet(s) 412 are not limited to Java Card applets, and instead may be any software application operable on contactless cards or other devices having limited memory. The one or more counter(s) 408 may comprise a numeric counter sufficient to store an integer. The customer identifier 414 may comprise a unique alphanumeric identifier assigned to a user and/or the contactless card 102, and the identifier may distinguish the user and the contactless card from other contactless cards and users. In some examples, the customer identifier 414 may identify both a customer and an account assigned to that customer and may further identify the contactless card 102 associated with the customer's account. As stated, the account number(s) 410 may include thousands of one-time use virtual account numbers associated with the contactless card 102. An applet(s) 412 of the contactless card 102 may be configured to manage the account number(s) 410 (e.g., to select an account number(s) 410, mark the selected account number(s) 410 as used, and transmit the account number(s) 410 to a mobile device for auto-filling by an autofill service.

In embodiments, the contactless card 102 may include additional applet(s) 412 to perform the operations to discussed herein. For example, the contactless card 102 may include applet(s) 412 to perform transactions, enable accessing a space, perform verification operations, launch applications other devices, auto-fill forms, or fields on another device. For example, an applet(s) 412 may be configured to process data from other devices, such as POS terminals or other computing devices, to perform transactions. In another example, an applet 412 may be configured to communicate with a smart lock or access system to enable a user to gain access via a lock or system to a space or locked area. In another example, an applet(s) 412 may be configured to exchange data with a mobile device via an interface and cause a mobile app to open on the mobile device, such as a banking app. In another example, an applet(s) 412 may be configured to communicate with a mobile device to provide information to the mobile device that may be auto filled into a field, e.g., customer account information, name, exp date, cvv value, etc. An applet(s) 412 may be configured to provide identifying information, such as the customer identifier 414 to another device as part of a verification process. Embodiments are not limited in this manner. In some instances, the contactless card 102 may be configured to provide a single function, e.g., only configured to perform transactions. However, in other instances, the contactless card 102 may be a multi-function and include multiple applet(s) 412 to perform operations, e.g., perform transactions, and provide access to spaces.

The contactless card 102 may include interfaces to communicate with other devices, including an NFC interface 420, a Bluetooth interface 422, a contact interface 428, and a stripe 426. The NFC interface 420 may be coupled with one or more antenna(s) 418 and include circuitry configured to communicate wirelessly with other devices. The NFC interface 420 may be configured to operate in accordance with the EMV contactless specification to communicate data with other devices. In addition to communicating data, the NFC interface 420 may be configured to harvest power from other devices to power itself and one or more components of the contactless card 102 at least partially. Specifically, the NFC interface 420 may include circuitry to energize when in the presence of a magnetic field generated by another device, such as a wireless card reader. The power may then be supplied to other components via circuitry. In some instances, at least a portion of power may be supplied to power component 424 for storage for later use. In some instances, the power component 424 may include circuitry to energize and provide power to the NFC interface 420 to operate.

The Bluetooth interface 422 may be a Bluetooth Low Energy interface configured to communicate with other devices in accordance with the Bluetooth Low Energy protocol. The Bluetooth Low Energy interface uses the 2.4 GHz radio frequencies, which allows dual-mode devices to share a single radio antenna.

In one embodiment, the Bluetooth interface 422 may be utilized to detect other devices nearby to determine if they are trusted devices. The contactless card 102 utilizing the Bluetooth interface 422 may detect other BLE devices by broadcasting advertising packets (ADV_INT packets). This is done using three separate channels (frequencies), to reduce interference. For example, the contactless card 102 may send a packet on at least one of these three channels, with a repetition period called the advertising interval. To reduce the chance of multiple consecutive collisions, a random delay of up to 10 milliseconds is added to each advertising interval.

In embodiments, a device within communication range may receive or detect at least one of the advertisement packets communicated by the Bluetooth interface 422 and send a response. The response may be a scan request response packet, e.g., "SCAN_REQ" packet. The scan request packet may be received by the Bluetooth interface 422 and include the address of the sender of the advertisement packets and its own address. Specifically, the scan request may include a payload including the address of the Bluetooth interface 422 (advertiser) and the address of the responding device (scanner). The contactless card 102 may collect or determine all the other responding device's Bluetooth interface addresses and store them in memory. The addresses may be provided to a server to determine whether one of the responding devices is a trusted device.

In embodiments, the contactless card 102 may include additional interfaces, including a contact interface 428 and a stripe 426. The contact interface 428 may include circuitry coupled with the contact pad 304 that is configured to engage contacts of a reader system. The contactless card 102 may be configured to communicate with another device contact interface 428 in accordance with the contact EMV standard.

In some embodiments, the contact interface 428 may be configured to receive power from the other device via the physical connection between contactless card 102 and the other device. The power may be supplied to other components, such as the Bluetooth interface 422, to perform discovery or the battery to perform operations at a later point in time. In embodiments, stripe 426 may be a magnetic stripe configured to provide information when the contactless card 102 is swiped through a card reader.

The processor 402 and memory elements of the foregoing exemplary embodiments are described with reference to the contact pad 304, but the present disclosure is not limited thereto. It is understood that these elements may be implemented outside the contact pad 304 or entirely separate from it, or as further elements in addition to processor 402 and memory 404 elements located within the contact pad 304.

In some examples, the contactless card 102 may comprise one or more antenna(s) 418. The one or more antenna(s) 418 may be placed within the contactless card 102 and around the processing circuitry 416 of the contact pad 304. For example, the one or more antenna(s) 418 may be integral to the processing circuitry 416 and one or more antenna(s) 418 may be used with an external booster coil. As another example, the one or more antenna(s) 418 may be external to the contact pad 304 and the processing circuitry 416.

In an embodiment, the coil of contactless card 102 may act as the secondary of an air core transformer. The terminal may communicate with the contactless card 102 by cutting power or amplitude modulation. The contactless card 102 may infer the data transmitted from the terminal using the gaps in the contactless card's power connection, which may be functionally maintained through one or more capacitors. The contactless card 102 may communicate back by switching a load on the contactless card's coil or load modulation. Load modulation may be detected in the terminal's coil through interference. More generally, using the antenna(s) 418, processor 402, and/or the memory 404, the contactless card 102 provides a communications interface to communicate via NFC, Bluetooth, and/or Wi-Fi communications.

As explained above, contactless card 102 may be built on a software platform operable on smart cards or other devices having limited memory, such as JavaCard, and one or more or more applications or applets may be securely executed. Applet(s) 412 may be added to contactless cards to provide a one-time password (OTP) for multifactor authentication (MFA) in various mobile application-based use cases. Applet(s) 412 may be configured to respond to one or more requests, such as near field data exchange requests, from a reader, such as a mobile NFC reader (e.g., of a mobile device or point-of-sale terminal) and produce an NDEF message that comprises a cryptographically secure OTP encoded as an NDEF text tag.

One example of an NDEF OTP is an NDEF short-record layout (SR=1). In such an example, one or more applet(s) 412 may be configured to encode the OTP as an NDEF type 4 well known type text tag. In some examples, NDEF messages may comprise one or more records. The applet(s) 412 may be configured to add one or more static tag records in addition to the OTP record.

In some examples, the one or more applet(s) 412 may be configured to emulate an RFID tag. The RFID tag may include one or more polymorphic tags. In some examples, each time the tag is read, different cryptographic data is presented that may indicate the authenticity of the contactless card. Based on the one or more applet(s) 412, an NFC read of the tag may be processed, the data may be transmitted to a server, such as a server of a banking system, and the data may be validated at the server.

In some examples, the contactless card 102 and server may include certain data such that the card may be properly identified. The contactless card 102 may include one or more unique identifiers (not pictured). Each time a read operation takes place, the counter(s) 408 may be configured to increment. In some examples, each time data from the contactless card 102 is read (e.g., by a mobile device), the counter(s) 408 is transmitted to the server for validation and determines whether the counter(s) 408 are equal (as part of the validation) to a counter of the server.

The one or more counter(s) 408 may be configured to prevent a replay attack. For example, if a cryptogram has been obtained and replayed, that cryptogram is immediately rejected if the counter(s) 408 has been read or used or otherwise passed over. If the counter(s) 408 has not been used, it may be replayed. In some examples, the counter that is incremented on the card is different from the counter that is incremented for transactions. The contactless card 101 is unable to determine the application transaction counter(s) 408 since there is no communication between applet(s) 412 on the contactless card 102.

In some examples, the counter(s) 408 may get out of sync. In some examples, to account for accidental reads that initiate transactions, such as reading at an angle, the counter(s) 408 may increment but the application does not process the counter(s) 408. In some examples, when the mobile device 10 is woken up, NFC may be enabled and the device 110 may be configured to read available tags, but no action is taken responsive to the reads.

To keep the counter(s) 408 in sync, an application, such as a background application, may be executed that would be configured to detect when the mobile device 110 wakes up and synchronize with the server of a banking system indicating that a read that occurred due to detection to then move the counter 104 forward. In other examples, Hashed One Time Password may be utilized such that a window of mis-synchronization may be accepted. For example, if within a threshold of 10, the counter(s) 408 may be configured to move forward. But if within a different threshold number, for example within 10 or 1000, a request for performing re-synchronization may be processed which requests via one or more applications that the user tap, gesture, or otherwise indicate one or more times via the user's device. If the counter(s) 408 increases in the appropriate sequence, then it possible to know that the user has done so.

The key diversification technique described herein with reference to the counter(s) 408, master key, and diversified key, is one example of encryption and/or decryption a key diversification technique. This example key diversification technique should not be considered limiting of the disclosure, as the disclosure is equally applicable to other types of key diversification techniques.

During the creation process of the contactless card 102, two cryptographic keys may be assigned uniquely per card. The cryptographic keys may comprise symmetric keys which may be used in both encryption and decryption of data. Triple DES (3DES) algorithm may be used by EMV, and it is implemented by hardware in the contactless card 102. By using the key diversification process, one or more keys may be derived from a master key based upon uniquely identifiable information for each entity that requires a key.

In some examples, to overcome deficiencies of 3DES algorithms, which may be susceptible to vulnerabilities, a session key may be derived (such as a unique key per session) but rather than using the master key, the unique card-derived keys and the counter may be used as diversification data. For example, each time the contactless card 101 is used in operation, a different key may be used for creating the message authentication code (MAC) and for performing the encryption. This results in a triple layer of cryptography. The session keys may be generated by the one or more applets and derived by using the application transaction counter with one or more algorithms (as defined in EMV 4.3 Book 2 A1.3.1 Common Session Key Derivation).

Further, the increment for each card may be unique, and assigned either by personalization, or algorithmically assigned by some identifying information. For example, odd numbered cards may increment by 2 and even numbered cards may increment by 5. In some examples, the increment may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In another example, the NDEF record may be encoded in hexadecimal format.

Figure 5:
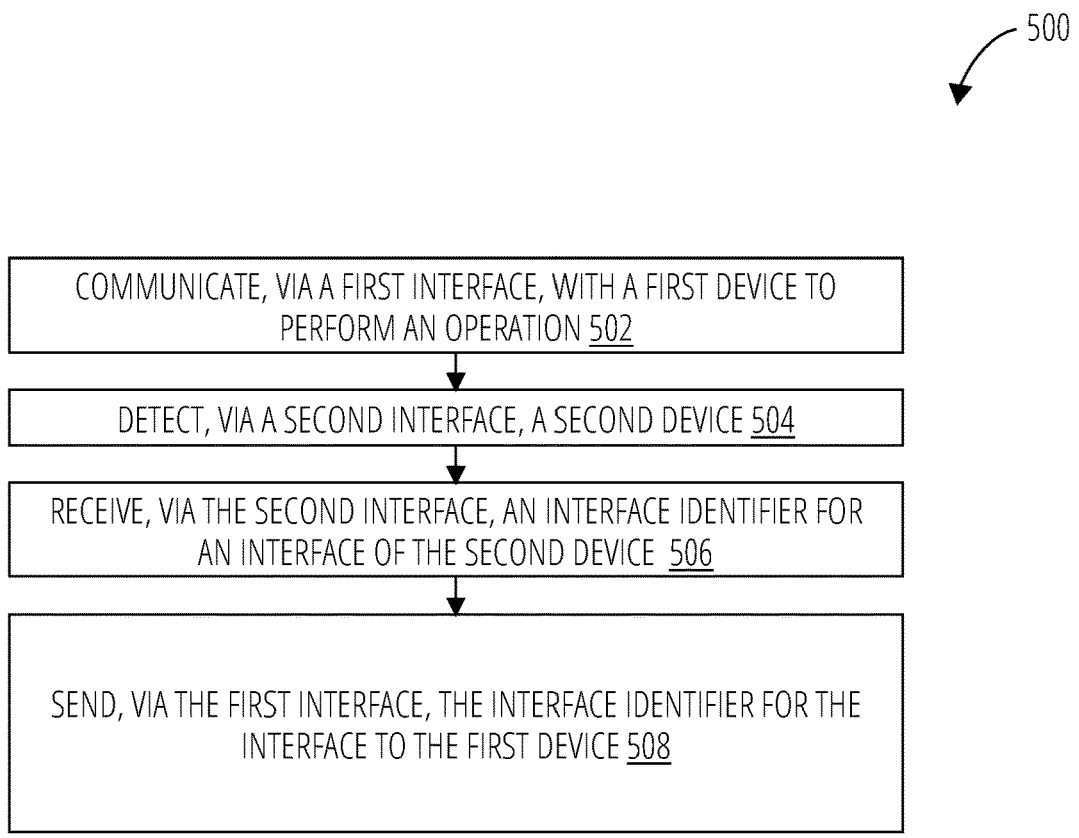
FIG. 5 illustrates a routine 500 in accordance with embodiments.

FIG. 5 illustrates an example of a routine 500 that may be performed in accordance with the embodiments discussed herein. Specifically, routine 500 may be performed by a contactless card to operate, such as a transaction, and provide additional security features by detecting one or more trusted devices within a short-range wireless communication distance.

In block 502, the routine 500 includes communicating, via a first interface, with a first device to perform an operation. For example, a contactless card 102 may communicate with a computing device 104 to perform a transaction via an NFC interface or EMV contact interface of the contactless card 102. The computing device 104 may be a POS terminal, mobile device, or anything device capable of processing transactions for the sale of goods and services. In embodiments, the contactless card 102 may communicate with the computing device 104 data to perform the operation, such as the transaction. In some instances, the data may be in a cryptogram and include an account number, a unique identifier, an expiration date, a CVV code, or any combination thereof.

In block 504, the routine 500 includes performing, via a second interface, a discovery of a second device. In some embodiments, the contactless card 102 may be configured to look for or detect nearby devices as part of the processing of the operation. In other instances, the contactless card 102 may receive a request or an instruction from the computing device 104 to perform the detection. In one example, the contactless card 102 may perform a discovery operation via a Bluetooth interface. The discovery operation may include communicating one or more advertisements and waiting for any responses sent by scanning devices, such as a mobile device or another Bluetooth-enabled device.

Further and at block 506, the routine 500 includes receiving, via the second interface, an interface identifier for an interface of the second device. Specifically, the contactless card 102 may receive one or more responses from computing device 104, each response including a payload having at least the returning device's interface identifier and its own interface identifier. In some instances, the interface identifier may be a Bluetooth address associated with the device's Bluetooth interface. The address may be public or private, and embodiments are not limited in this manner. Note that embodiments are also not limited to utilizing Bluetooth, and in other instances, a different short-range interface may be implemented and used, e.g., the NFC interface.

In block 508, the routine 500 sends, via the first interface, the interface identifier for the interface to the first device. For example, the contactless card 102 may receive the interface identifier by the Bluetooth interface and communicate the identifier to computing device 104 in an NFC communication. The first device or computing device 104 may be configured to verify that the interface identifier to determine that the interface is associated with the contactless card to perform the operation. In some instances, the computing device 104 may send the interface identifier to a server, and the server may determine whether the interface identifier is associated with the contactless card 102 in a data store or database. The computing device 104 may send additional information, such as transaction or card information for the server to process to further perform the operation. The server may verify the information provided by the contactless card 102 and the computing device 104 and enable the operation, e.g., perform the transaction. If the information from the contactless card 102 and/or the computing device 104 cannot be verified, the server may prevent the operation from occurring.

Figure 6:
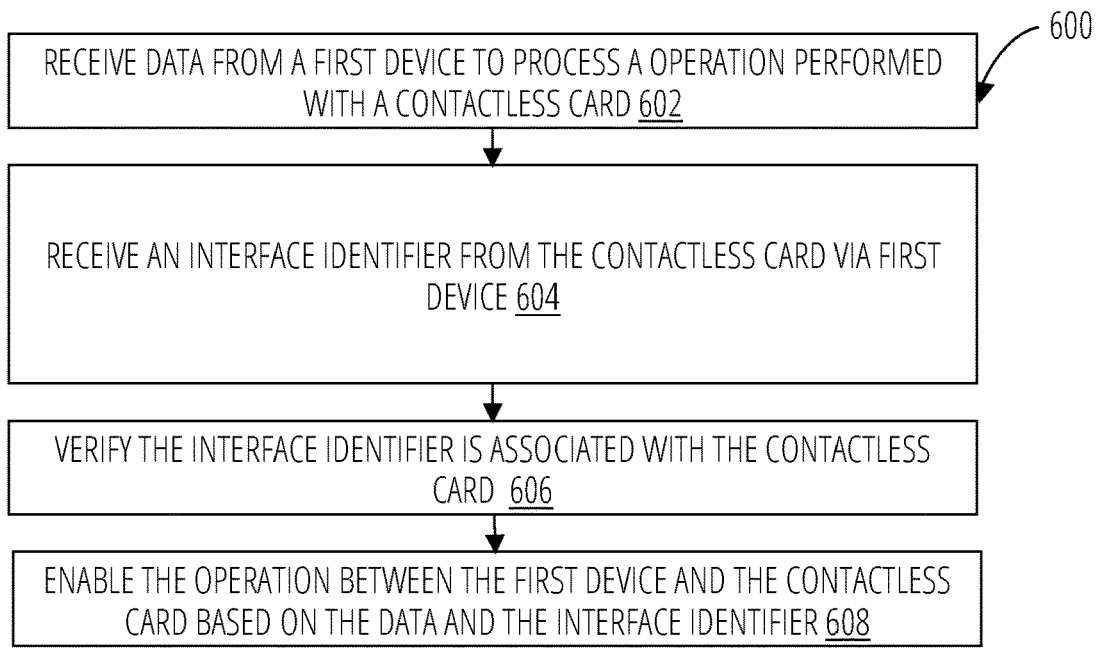
FIG. 6 illustrates a routine 600 in accordance with embodiments.

FIG. 6 illustrates an example of a routine 600 that may be performed in accordance with the embodiments discussed herein. For example, routine 600 may be performed by a server 106 of a verification system or banking system to perform an operation with a contactless card 102 and another computing device 104.

In block 602, the routine 600 includes receiving data from a first device to process an operation between the first device and a contactless card. For example, a server 106 may receive data from a computing device 104 to process an operation, such as a transaction conducted between the computing device 104 and a contactless card 102. The data may include transaction data, including a price, a location, an identifier of the first device, a time/date, etc. The data may also include information received by the computing device 104 from the contactless card 102, such as account information, a unique identifier, a CVV, an expiration date, etc. In some instances, the information from the contactless card 102 may be encrypted and sent in a cryptogram, as discussed herein.

In block 604, the routine 600 includes receiving an interface identifier from the contactless card via first device. For example, the contactless card 102 may communicate the interface identifier to the computing device 104 and the computing device 104 may send the interface identifier to the server 106. In embodiments, the contactless card 102 is configured to obtain the interface identifier from another device within a short-range communication range, and the interface identifier identifies an interface of the other device. For example, the contactless card 102 may utilize a Bluetooth interface and a discovery process to detect every device within Bluetooth communication range of the contactless card 102. The contactless card 102 may obtain several interface identifiers, each associated with a different interface of a different device. Each interface identifier may be communicated to the computing device 104 and to the server 106.

In block 606, the routine 600 includes verifying the interface identifier is associated with the contactless card. Specifically, the server 106 may determine that the interface identifier is associated with the contactless card 102 in a database and a data store. In embodiments, the interface identifier may initially be associated with the contactless card 102 as part of a registration process. As discussed herein, server 106 and/or the corresponding system may enable a user to register one or more devices and interface identifiers with a contactless card 102 as a trusted device 116 that can be used as a verification to perform operations, such as transactions.

In block 608, the routine 600 includes enabling the operation between the first device and the contactless card based on the data. For example, the server 106 may permit a transaction to occur utilizing the account associated with the contactless card 102. Enabling the operation may include sending a communication from the server 106 to the computing device 104 to confirm that the verification was successful, and the operation is permitted to occur. Enabling the operation also includes performing one or more additional operations such that the operation occurs. For example, the server 106 may send one or more communications with other devices or systems to cause a transfer of funds to be sent from an account associated with the contactless card 102 to an account associated with computing device 104. In another example, the server 106 may send a signal to a door or access system causing a door or access way to open. Embodiments are not limited in this manner.

Sometimes, the server 106 may perform an additional level of security before enabling the operation. For example, the server 106 may send a message or communication to a device associated with the contactless card 102 for the user to confirm the operation. The message or communication may cause a prompt to present on a display, and the user must respond to approve or disapprove the operation. In embodiments, the device receiving the confirmation may be the trusted device 116 but is not required to be. For example, the trusted device 116 may be a smartwatch and the server 106 may send the confirmation request to a mobile device associated with a contactless card 102.

Figure 7:
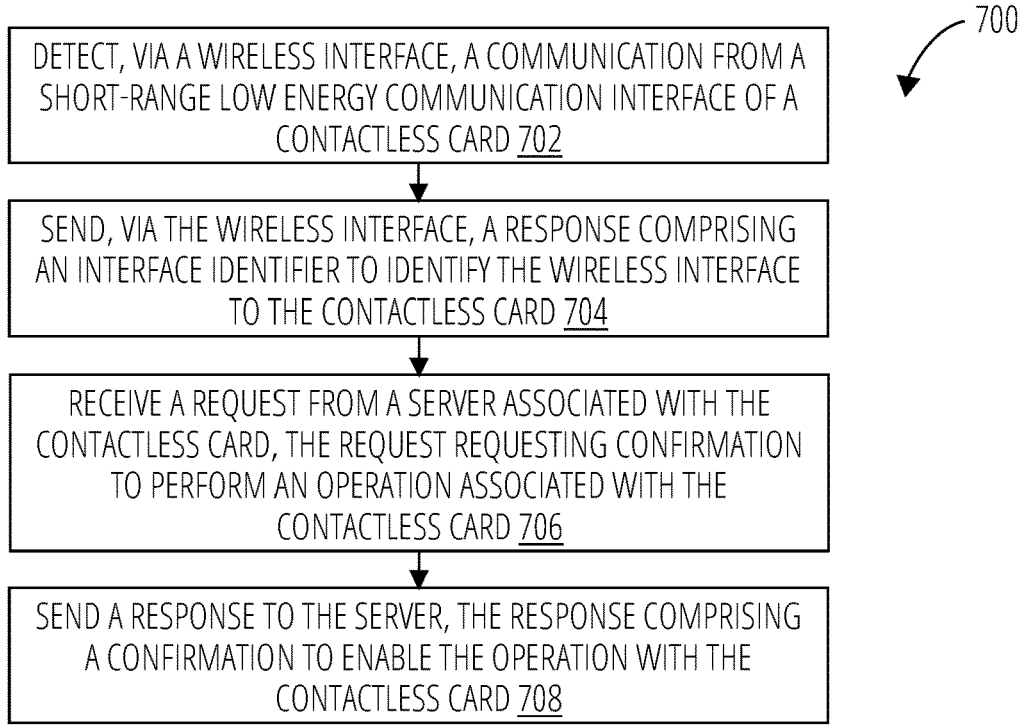
FIG. 7 illustrates a routine 700 in accordance with embodiments.

FIG. 7 illustrates an example of a routine 700 in accordance with the embodiments discussed herein. Specifically, routine 700 may be performed by a wireless device, such as a trusted device, near a contactless card 102.

In block 702, the routine 700 includes detecting, via a wireless interface, a communication from a short-range communication interface of a contactless card. For example, a wireless device, such as mobile phone, a wearable device, a mouse, a keyboard, or any other wireless capable device. In one example, the wireless device may be a Bluetooth device configured to communicate via the Bluetooth LE protocol. In one example, the device may be in scanning mode and detect the communication, such as an advertisement sent by the contactless card 102 via a Bluetooth interface. The Advertisement may include a payload having an interface identifier of the Bluetooth interface of the contactless card 102.

In block 704, the routine 700 routine includes sending, via the wireless interface, a response comprising an interface identifier to identify the wireless interface to the contactless card. For example, the device may generate and send a response including a payload having the identifier of the contactless card's 102 interface and its own Bluetooth interface identifier (address). The response may be a SCAN_REQ message.

In block 706, the routine 700 includes receiving a request from a server associated with the contactless card, the request requesting confirmation to perform an operation associated with the contactless card. For example, a wireless device, such as a mobile phone may receive a text or push message, causing a prompt to be displayed on the display of the phone. The prompt may request the user to accept or deny the operation occurs. And in block 708, the routine 700 includes sending a response to the server, the response includes a confirmation to enable the operation with the contactless card. In some instances, the response may include a denial to enable the operation to occur.

Figure 8:
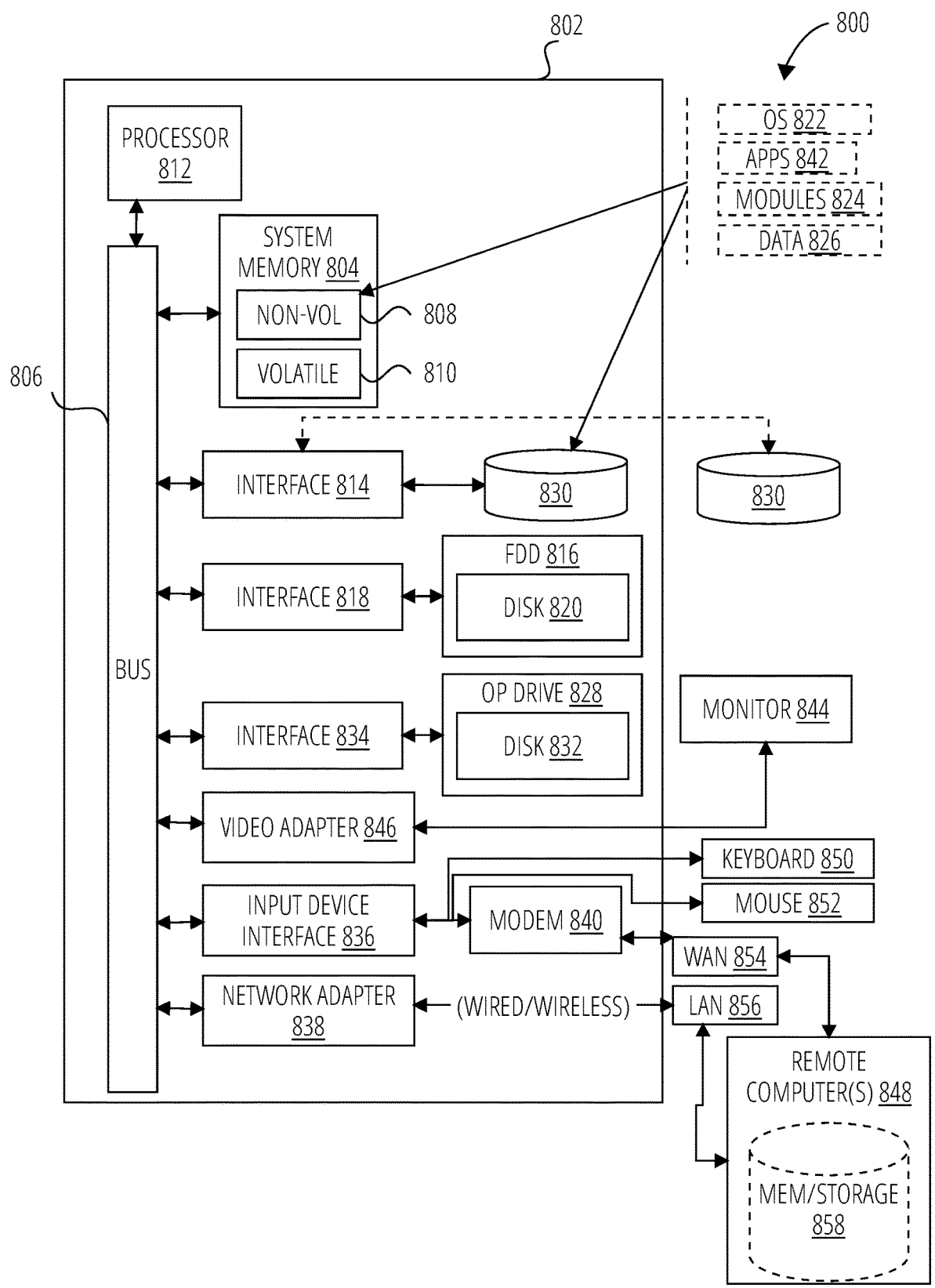
FIG. 8 illustrates a computer architecture 800 in accordance with embodiments.

FIG. 8 illustrates an embodiment of an exemplary computer architecture 800 suitable for implementing various embodiments as previously described. In one embodiment, the computer architecture 800 may include or be implemented as part of one or more systems or devices discussed herein.

As used in this application, the terms "system" and "component" are intended to refer to a computer-related entity, either hardware, a combination of hardware and software, software, or software in execution, examples of which are provided by the exemplary computing computer architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 100.

As shown in FIG. 8, the computing architecture 100 includes a processor 812, a system memory 804 and a system bus 806. The processor 812 can be any of various commercially available processors.

The system bus 806 provides an interface for system components including, but not limited to, the system memory 804 to the processor 812. The system bus 806 can be any of several types of bus structure that may further interconnect to a memory bus (with or without a memory controller), a peripheral bus, and a local bus using any of a variety of commercially available bus architectures. Interface adapters may connect to the system bus 608 via slot architecture. Example slot architectures may include without limitation Accelerated Graphics Port (AGP), Card Bus, (Extended) Industry Standard Architecture ((E) ISA), Micro Channel Architecture (MCA), NuBus, Peripheral Component Interconnect (Extended) (PCI(X)), PCI Express, Personal Computer Memory Card International Association (PCMCIA), and the like.

The computing architecture 100 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 804 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 804 can include non-volatile 808 and/or volatile 810. A basic input/output system (BIOS) can be stored in the non-volatile 808.

The computer 802 may include various types of computer-readable storage media in the form of one or more lower speed memory units, including an internal (or external) hard disk drive 830, a magnetic disk drive 816 to read from or write to a removable magnetic disk 820, and an optical disk drive 828 to read from or write to a removable optical disk 832 (e.g., a CD-ROM or DVD). The hard disk drive 830, magnetic disk drive 816 and optical disk drive 828 can be connected to system bus 806 the by an HDD interface 814, and FDD interface 818 and an optical disk drive interface 834, respectively. The HDD interface 814 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and non-volatile 808, and volatile 810, including an operating system 822, one or more applications 842, other program modules 824, and program data 826. In one embodiment, the one or more applications 842, other program modules 824, and program data 826 can include, for example, the various applications and/or components of the systems discussed herein.

A user can enter commands and information into the computer 802 through one or more wire/wireless input devices, for example, a keyboard 850 and a pointing device, such as a mouse 852. Other input devices may include microphones, infra-red (IR) remote controls, radio-frequency (RF) remote controls, game pads, stylus pens, card readers, dongles, fingerprint readers, gloves, graphics tablets, joysticks, keyboards, retina readers, touch screens (e.g., capacitive, resistive, etc.), trackballs, track pads, sensors, styluses, and the like. These and other input devices are often connected to the processor 812 through an input device interface 836 that is coupled to the system bus 806 but can be connected by other interfaces such as a parallel port, IEEE 1394 serial port, a game port, a USB port, an IR interface, and so forth.

A monitor 844 or other type of display device is also connected to the system bus 806 via an interface, such as a video adapter 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all the elements described relative to the computer 802, although, for purposes of brevity, only a memory and/or storage device 858 is illustrated. The logical connections depicted include wire/wireless connectivity to a local area network 856 and/or larger networks, for example, a wide area network 854. Such LAN and WAN networking environments are commonplace in offices and companies, and facilitate enterprise-wide computer networks, such as intranets, all of which may connect to a global communications network, for example, the Internet.

When used in a local area network 856 networking environment, the computer 802 is connected to the local area network 856 through a wire and/or wireless communication network interface or network adapter 838. The network adapter 838 can facilitate wire and/or wireless communications to the local area network 856, which may also include a wireless access point disposed thereon for communicating with the wireless functionality of the network adapter 838.

When used in a wide area network 854 networking environment, the computer 802 can include a modem 840, or is connected to a communications server on the wide area network 854 or has other means for establishing communications over the wide area network 854, such as by way of the Internet. The modem 840, which can be internal or external and a wire and/or wireless device, connects to the system bus 806 via the input device interface 836. In a networked environment, program modules depicted relative to the computer 802, or portions thereof, can be stored in the remote memory and/or storage device 858. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described herein may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

Figure 9:
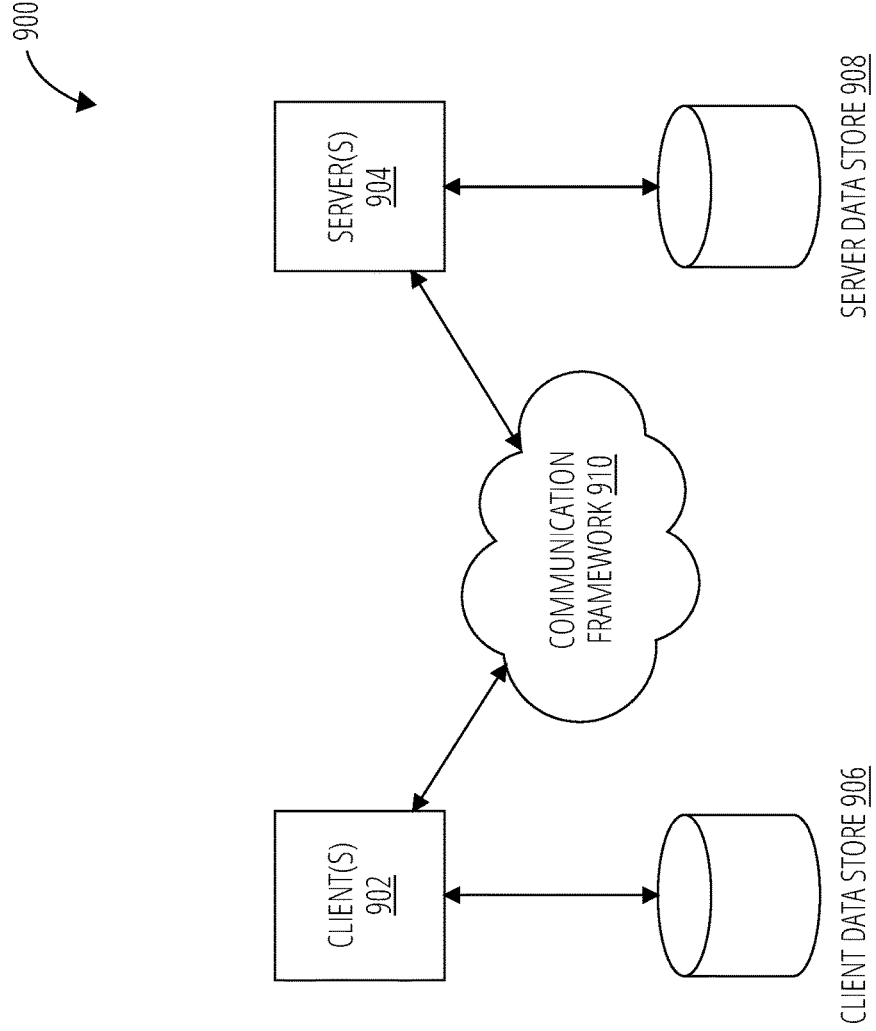
FIG. 9 illustrates a communications architecture 900 in accordance with embodiments.

FIG. 9 is a block diagram depicting an exemplary communications architecture 900 suitable for implementing various embodiments as previously described. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900, which may be consistent with systems and devices discussed herein.

As shown in FIG. 9, the communications architecture 900 includes one or more client(s) 902 and server(s) 904. The server(s) 904 may implement one or more functions and embodiments discussed herein. The client(s) 902 and the server(s) 904 are operatively connected to one or more respective client data store 906 and server data store 908 that can be employed to store information local to the respective client(s) 902 and server(s) 904, such as cookies and/or associated contextual information.

The client(s) 902 and the server(s) 904 may communicate information between each other using a communication framework 910. The communication framework 910 may implement any well-known communications techniques and protocols. The communication framework 910 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communication framework 910 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by client(s) 902 and the server(s) 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

What is claimed is:

1. A contactless card, comprising:
a first hardware interface;
a second hardware interface;
a memory configured to store instructions;
processing circuitry coupled with the first hardware interface, the second hardware interface, and the memory, the processing circuitry configured to execute the instructions, that when executed, cause the processing circuitry to:
communicate, via the first hardware interface, with a first device to perform an operation;
receive, via the first hardware interface, an indication from the first device to initiate the second hardware interface in a discovery mode;
initiate the second hardware interface in the discovery mode;
send, via the second hardware interface, a discovery message in an attempt to detect nearby devices;
receive, via the second hardware interface, an interface identifier for an interface of a second device, the interface identifier communicated in a response to the discovery message; and
send, via the first hardware interface, the interface identifier for the interface to the first device, the first device configured to verify that the interface identifier for the interface is associated with the contactless card to perform the operation.

2. The contactless card of claim 1, wherein the first hardware interface comprises an EMV interface or a near-field communication (NFC) interface.

3. The contactless card of claim 1, wherein the second hardware interface comprises a Bluetooth Low Energy interface.

4. The contactless card of claim 1, wherein the interface identifier comprises a Bluetooth address and the second hardware interface is a Bluetooth interface.

5. The contactless card of claim 1, wherein the first device comprises a point-of-sale terminal, and the operation comprises a transaction.

6. The contactless card of claim 1, wherein the second device comprises a mobile phone device or a wearable device.

7. The contactless card of claim 1, wherein the operation comprises a transaction, an access attempt to access a door, an authentication operation, or an autofill operation on mobile phone.

8. A method comprising:
communicating, via a first hardware interface of a contactless card, with a first device to perform an operation;
receiving, at the first hardware interface, an indication from the first device to initiate a second hardware interface of the contactless card in a discovery mode;
initiating the second hardware interface in the discovery mode;
sending, via the second hardware interface, a discovery message in an attempt to detect nearby devices;
receiving, via the second hardware interface, an interface identifier for an interface of a second device, the interface identifier communicated in a response to the discovery message;
sending, via the first hardware interface, the interface identifier for the interface to the first device, the first device configured to verify that the interface identifier for the interface is associated with the contactless card to perform the operation.

9. The method of claim 8, wherein the first hardware interface comprises an EMV interface or a near-field communication (NFC) interface.

10. The method of claim 8, wherein the second hardware interface comprises a Bluetooth Low Energy interface.

11. The method of claim 8, wherein the interface identifier comprises a Bluetooth address and the second hardware interface is a Bluetooth interface.

12. The method of claim 8, wherein the first device comprises a point-of-sale terminal, and the operation comprises a transaction.

13. The method of claim 8, wherein the second device comprises a mobile phone device or a wearable device.

14. The method of claim 8, wherein the operation comprises a transaction, an access attempt to access a door, an authentication operation, or an autofill operation on mobile phone.

15. A non-transitory computer-readable storage medium comprising instructions, which when executed by a processing circuit of a contactless card, causes the processing circuit to:
communicate, via a first hardware interface, with a first device to perform an operation;
receive, via the first hardware interface, an indication from the first device to initiate a second hardware interface in a discovery mode;
initiate the second hardware interface in the discovery mode;
send, via the second hardware interface, a discovery message in an attempt to detect nearby devices;
receive, via the second hardware interface, an interface identifier for an interface of a second device, the interface identifier communicated in a response to the discovery message; and
send, via the first hardware interface, the interface identifier for the interface to the first device, the first device configured to verify that the interface identifier for the interface is associated with the contactless card to perform the operation.

16. The non-transitory computer-readable storage medium of claim 15, wherein the first hardware interface comprises an EMV interface or a near-field communication (NFC) interface.

17. The non-transitory computer-readable storage medium of claim 15, wherein the second hardware interface comprises a Bluetooth Low Energy interface.

18. The non-transitory computer-readable storage medium of claim 15, wherein the interface identifier comprises a Bluetooth address and the second hardware interface is a Bluetooth interface.

19. The non-transitory computer-readable storage medium of claim 15, wherein the first device comprises a point-of-sale terminal, and the operation comprises a transaction.

20. The non-transitory computer-readable storage medium of claim 15, wherein the second device comprises a mobile phone device or a wearable device; and
wherein the operation comprises a transaction, an access attempt to access a door, an authentication operation, or an autofill operation on mobile phone.

* * * * *